(12) United States Patent
Fukushima et al.

(10) Patent No.: US 12,500,487 B2
(45) Date of Patent: Dec. 16, 2025

(54) MOTOR SYSTEM AND MOTOR DRIVE METHOD

(71) Applicant: Murata Machinery, Ltd., Kyoto (JP)

(72) Inventors: Daisuke Fukushima, Inuyama (JP);
Yoshiyuki Azuma, Inuyama (JP);
Atsuo Nagasawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 211 days.

(21) Appl. No.: 18/279,431

(22) PCT Filed: Feb. 3, 2022

(86) PCT No.: PCT/JP2022/004335
§ 371 (c)(1),
(2) Date: Aug. 30, 2023

(87) PCT Pub. No.: WO2022/185831
PCT Pub. Date: Sep. 9, 2022

(65) Prior Publication Data
US 2024/0186868 A1 Jun. 6, 2024

(30) Foreign Application Priority Data
Mar. 3, 2021 (JP) ................. 2021-033286

(51) Int. Cl.
*H02K 11/33* (2016.01)
*H02K 11/00* (2016.01)
*H02K 11/27* (2016.01)

(52) U.S. Cl.
CPC ......... *H02K 11/33* (2016.01); *H02K 11/0094* (2013.01); *H02K 11/27* (2016.01)

(58) Field of Classification Search
CPC .... H02K 11/33; H02K 11/0094; H02K 11/27; H02P 6/04; H02P 5/74; H02P 25/06
See application file for complete search history.

(56) References Cited

U.S. PATENT DOCUMENTS 9,479,157 B2 * 10/2016 Hanamura ............. B60L 50/51
2009/0309529 A1 * 12/2009 Shoda ................... H02P 25/064
318/490

FOREIGN PATENT DOCUMENTS

DE 2417982 A1 * 10/1974 ................ H02P 5/68
GB 1 463 770 A 2/1977
(Continued)

OTHER PUBLICATIONS

DE2417982A1_translate (Year: 1974).*
(Continued)

*Primary Examiner* — Tulsidas C Patel
*Assistant Examiner* — Mohammed Ahmed Qureshi
(74) *Attorney, Agent, or Firm* — DLA Piper LLP (US)

(57) ABSTRACT

A motor system includes a motor driver; motors that generate a driving force by power supplied by the motor driver; a supply switch that switches a circuit so that the power supplied by the motor driver is supplied to any one of the motors; an output controller that controls the motor driver so that the motor driver supplies power matched to the one motor to which the power is supplied; a switching controller that distributes the power supplied by the motor driver to the motors in a time-divisional manner by controlling the supply switch so that the one of the motors to which the power is supplied is cyclically switched; and a driving force reduction suppressor that controls suppression reduction of the driving force generated by the other of the motors while the power being supplied to one of the motors that are cyclically supplied with the power.

7 Claims, 11 Drawing Sheets

(56) References Cited

FOREIGN PATENT DOCUMENTS

| | | | |
|---|---|---|---|
| JP | S49-128215 A | | 12/1974 |
| JP | S59-198895 A | | 11/1984 |
| JP | 2004-159385 A | | 6/2004 |
| JP | 2007-288964 A | | 11/2007 |
| JP | 2017184448 A | * | 10/2017 |

OTHER PUBLICATIONS

JP-2017184448-A_translate (Year: 2017).*
International Search Report dated Apr. 5, 2022 in counterpart International Application No. PCT/JP2022/004335 w/English translation.
Written Opinion dated Apr. 5, 2022 in counterpart International Application No. PCT/JP2022/004335.

* cited by examiner

MOTOR SYSTEM AND MOTOR DRIVE METHOD

TECHNICAL FIELD

This disclosure primarily relates to a motor system with a plurality of motors.

BACKGROUND

Japanese Patent Application Laid-Open 2004-159385 discloses a system including a linear motor, an arithmetic processor, a group of drivers, a row of coils, and a group of FET-SWs (Field Effect Transistor-Switch). The linear motor has a plurality of movable elements. The arithmetic processor calculates drive command values for each movable element of the linear motor. The driver includes a plurality of drivers and the row of coils includes a plurality of coils. The arithmetic processor selects a driver and a coil according to a current movable element position. The group of FET-SWs includes a plurality of switches. The arithmetic processor switches the switches of the group of FET-SWs so that the drive command value is supplied to the driver and the coil selected by the arithmetic processor. With the above configuration, the movable element can be driven by supplying the drive command value to the driver and the coil according to the current movable element position.

In the configuration shown in JP '385, one movable element corresponds to one driver. In other words, although one driver can drive multiple motors, one driver can only drive a single motor at a time. In other words, in the configuration shown in JP '385, one driver cannot drive a plurality of motors simultaneously.

It would therefore be helpful to provide a motor system in which one motor driver can drive the plurality of motors simultaneously.

SUMMARY

We thus provide a motor system having a motor driver, a plurality of motors, a supply switch unit, an output controller, a switching controller, and a driving force reduction suppression unit. The motor generates a driving force by power supplied by the motor driver. The supply switch unit switches a circuit so that the power supplied by the motor driver is supplied to any one of the plurality of the motors. The output controller controls the motor driver so that the motor driver supplies the power matched to the one motor to which the power is supplied. The switching controller controls the supply switch unit so that the power supplied by the motor driver is distributed to the plurality of the motors in a time-division manner by controlling the supply switch unit so that the one the motor to which power is supplied is cyclically switched. The driving force reduction suppression unit controls to suppress reduction of the driving force generated by the other of the plurality of motors while the power being supplied to one of the plurality of the motors that are cyclically supplied with the power.

This allows a single motor driver to drive multiple motors substantially simultaneously. In addition, the driving force reduction suppression unit can suppress the reduction of the driving force while power is not supplied so that the driving force of the respective motors is not reduced to an extreme level, thus allowing the motors to generate the driving force that is at or close to the target value.

It is preferable that the motor is a three-phase motor. The motor system has a short-circuit switch unit for each of the plurality of the motors that short-circuits a U-phase, a V-phase, and a W-phase that supply power to the motor. The driving force reduction suppression unit closes the short-circuit switch unit corresponding to the motor that is not supplied with power among the plurality of the motors that are cyclically supplied with power to short-circuit the U-phase, V-phase, and W-phase.

This makes it easier for current to be held by closing the short circuit switch unit. Therefore, a decrease in current (i.e., a decrease in the driving force) during the period when power is not being supplied can be suppressed.

The circuit connecting the motor driver with the short-circuit switch unit is preferably provided with a negative power supply or an electrical resistance that reduces the current supplied from the motor driver through the short-circuit switch to the motor.

This reduces the current supplied from the motor driver to the motor through the short-circuit switch unit, thereby stabilizing the current detected by the motor driver and allowing the motor driver to correctly detect the current flowing in the motor.

It is preferable that the motor driver includes a constant potential terminal whose potential is constant. When the short circuit switch unit is closed, the short-circuited point is connected to the constant potential terminal.

This allows for stable switching of the short-circuit switch unit by maintaining a constant potential at the short-circuited point.

When a waveform indicating a change in current to be supplied to the motor to generate a required driving force is referred to as a target waveform, it is preferable that the driving force reduction suppression unit controls to flow a current higher than a current indicated by the target waveform to the motor in a state where the supply switch unit is closed (the short-circuit switch unit is opened).

If the current indicated by the target waveform is supplied to the motor, the current will decrease while the current is not supplied, and as a result, the required driving force may not be generated. In this regard, by supplying the motor with a current higher than that indicated by the target waveform as described above, the driving force close to the target value can be generated.

It is preferred that the motor is a linear motor.
It is preferred that the motor is a rotary motor.

We also provide a motor drive method. The method drives a plurality of motors by repeatedly performing a selection process, a switching process, and a power control process. In the selection process, the motor to be supplied with power is selected among the plurality of the motors. In the switching process, a switch unit connecting a motor driver and the plurality of the motors is switched so that power is supplied from the motor driver to the motor selected in the selection process. In the power control process, the motor driver is controlled so that power according to the selected motor is supplied. While the power being supplied to one of the plurality of the motors to which power is supplied, a driving force reduction suppression process is performed to suppress reduction of a driving force generated by the other of the plurality of the motors.

This allows a single motor driver to drive multiple motors substantially simultaneously. In addition, by providing the driving force reduction suppression unit, the reduction in driving force during the period when power is not supplied can be suppressed so that the driving force of each motor is not reduced to an extreme level, and thus the driving force can be generated at or close to the target value.

DESCRIPTION OF THE REFERENCE NUMERALS

Figure 1:
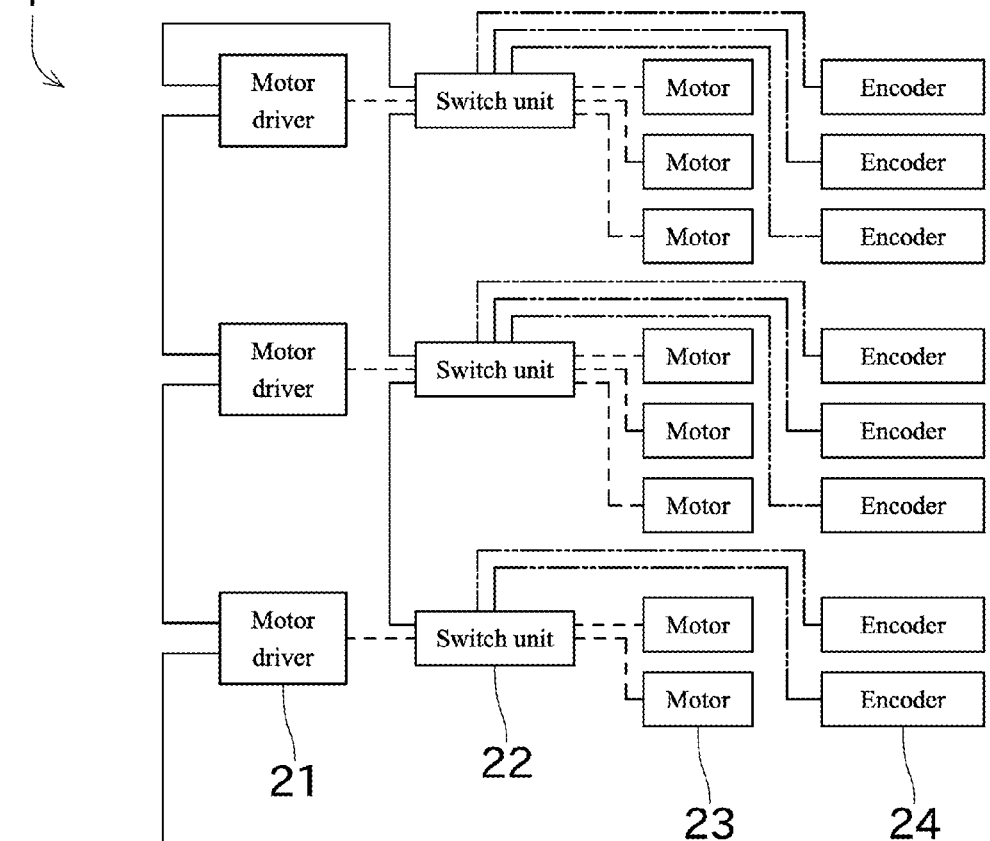
FIG. 1 is a block diagram of a motor system according to one example.
Figure 1:
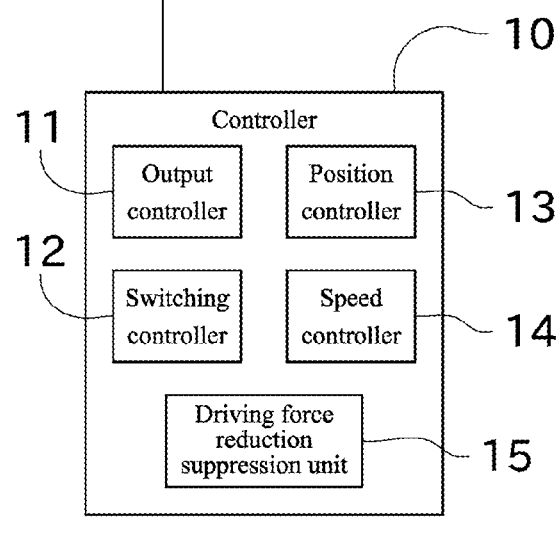

1 Motor system
10 Controller
11 Output controller
12 Switching controller
13 Position controller
14 Speed Controller
15 Driving force reduction suppression unit
21 Motor Driver
22 Switch unit
23 Motor
24 Encoder
31 Supply switch unit
32 Short-circuit switch unit

DETAILED DESCRIPTION

Next, our systems and methods will be described with reference to the drawings. FIG. 1 is a block diagram of a motor system 1.

Motor system 1 is a system for controlling a plurality of motors. As shown in FIG. 1, the motor system 1 has a controller 10, a plurality of motor drivers 21, a plurality of switch units 22, a plurality of motors 23, and a plurality of encoders 24. The motor system 1 may include only one motor driver 21 or only one switch unit 22. Although FIG. 1 shows an example configuration including one encoder 24 corresponding to one motor 23, the motor system 1 may be configured to include the plurality of encoders 24 corresponding to one motor 23, or one encoder 24 corresponding to the plurality of motors 23.

The controller 10 is an information processor and includes a computing device such as a CPU and a storage device such as a HDD, an SSD, or a flash memory. The computing device reads and executes a program stored in the storage device, allowing the controller 10 to perform various controls related to the motor system 1. Typical controls performed by the controller 10 include output control, switching control, position control, speed control, and driving force reduction suppression (details are described below), and functional elements that perform these controls are referred to as an output controller 11, a switching controller 12, a position controller 13, a speed controller 14, and a driving force reduction suppression unit 15, respectively. The controller 10 may be capable of performing controls other than those described above. Some or all of the output controller 11, the switching controller 12, the position controller 13, and the speed controller 14 included in the controller 10 may be provided in the motor driver 21. That is, the controller 10 may be provided as a separate controller from the motor driver 21, or may be built into the motor driver 21. The driving force reduction suppression unit 15 may be provided in a separate controller different from the controller 10.

The motor driver 21 supplies power to the motor 23 to operate the motor. The motor driver 21 is, for example, a servo amplifier or an inverter. The motor driver 21 is controlled by the controller 10. In detail, the output controller 11 in the controller unit 10 generates an output control signal to define the power to be supplied by the motor driver 21 and sends the output control signal to the motor driver 21. The motor driver 21 generates a current of a waveform corresponding to the received output control signal and supplies the current of the waveform to the switch unit 22. The controller 10 can set the destination of the output control signal. Thus, the currents supplied by the plurality of the motor drivers 21 can be different from each other.

The switch unit 22 supplies the current input from the motor driver 21 to the motor 23. In this example, the motor driver 21 and the switch unit 22 are provided in a one-to-one correspondence. Therefore, the power supplied by the motor driver 21 is always input to the corresponding switch unit 22. The motor driver 21 and the switch unit 22 may correspond one-to-plural or plural-to-one instead of one-to-one.

The switch unit 22 is connected to the motor driver 21 at an input side and to the plurality of motors 23 at an output side. The switch unit 22 is, for example, a switch substrate and is configured as a circuit including a plurality of switches (details are described below). By switching a switch included in the switch unit 22, the motor 23 to which the power is supplied is switched. The motor 23 to which the power is supplied is only one of the plurality of the motors 23 connected to the switch unit 22. The switch unit 22 is controlled by the controller 10. In detail, the switching controller 12 of the controller 10 generates switching signal to switch the switch unit 22 and sends the switching signal to the switch unit 22. The switch unit 22 switches one or more switches according to the received switching signal. As a result, the power is supplied to the motor 23 specified by the controller 10. The controller 10 can set a destination of the switching signal. Thus, the open/close state of the switches of the plurality of switches 22 can be different from each other.

The motor 23 has a stator and a movable element. Preferably, one of the stator and the movable element includes a permanent magnet and the other includes a coil. The coil becomes an electromagnet when the power is supplied to the coil from the motor driver 21. This causes a repulsive or attractive force between the stator and the movable element, resulting in relative motion of the movable element with respect to the stator. The motor 23 in this example is a linear motor in which the movable element moves linearly (slides) with respect to the stator. Alternatively, the motor 23 may be a rotary motor in which the movable element (rotor) rotates with respect to the stator (stator).

The encoder 24 is provided for each motor 23 respectively and detects an operating state of the motor 23, in detail, relative displacement of the movable element with respect to the stator. Since the motor 23 is a linear motor in this example, the encoder 24 detects a position of the movable element relative to the stator (a position on a travel path of the movable element). The encoder 24 is, for example, a magnetic sensor provided on the travel path of the movable element. If the motor 23 is the rotary motor, the encoder 24 should be, for example, a Hall element that detects an angle of rotation of the movable element. A detection result of the encoder 24 is transmitted to the control unit 10.

The controller 10 performs position control and speed control of the movable element based on the detection result of the encoder 24. In detail, the position controller 13 of the controller 10 identifies the respective positions, movement amount and the like of a plurality of movable elements provided in the motor system 1 based on the detection result of the encoder 24 and other information (selection process). Other information is, for example, a conveyance status of an item (conveyance command, destination of the item and the like) when the motor system 1 is used for conveyance. The speed controller 14 in the controller 10 identifies target speed for each of the plurality of movable elements in the motor system 1 based on the detection result of the encoder 24 and other information. Other information is, for example, a predetermined set speed and upper limit speed when the motor system 1 is used for conveyance.

Next, the switching controller 12 generates a switching signal to ensure that the power is supplied to the motor 23 of the movable element identified by the position controller 13 and the speed controller 14 (in other words, the switching signal to ensure that the output side of the switch unit 22 is connected to the relevant motor 23). The switching controller 12 sends the switching signal to the switch unit 22 corresponding to the relevant motor 23 (switching process).

Next, the output controller 11 determines the power (in detail, the waveform of the power) to be supplied to the relevant motor 23 based on calculation results of the position controller 13 and the speed controller 14, and generates the output control signal for the motor driver 21 to supply this power. The output controller 11 sends the output control signal to the motor driver 21 corresponding to the relevant motor 23 (power control process).

By performing the above control, the relevant motor 23 can be driven in an appropriate direction and speed. Since this example includes the plurality of the motor drivers 21, the same control is performed for the plurality of the motors 23 simultaneously. In addition, the motor 23 to which the power is supplied is changed according to change in circumstances.

In this example, the plurality of the motors 23 correspond to one motor driver 21, and the switch unit 22 switches so that the power is distributed to the relevant motor 23 in a time-division manner. This allows one motor driver 21 to drive substantially the plurality of the motors 23 simultaneously. Therefore, the number of the motor drivers 21 can be reduced compared to a configuration in which the motor drivers 21 are provided for each motor 23. As a result, an installation cost of the motor system 1 can be reduced.

Figure 2:
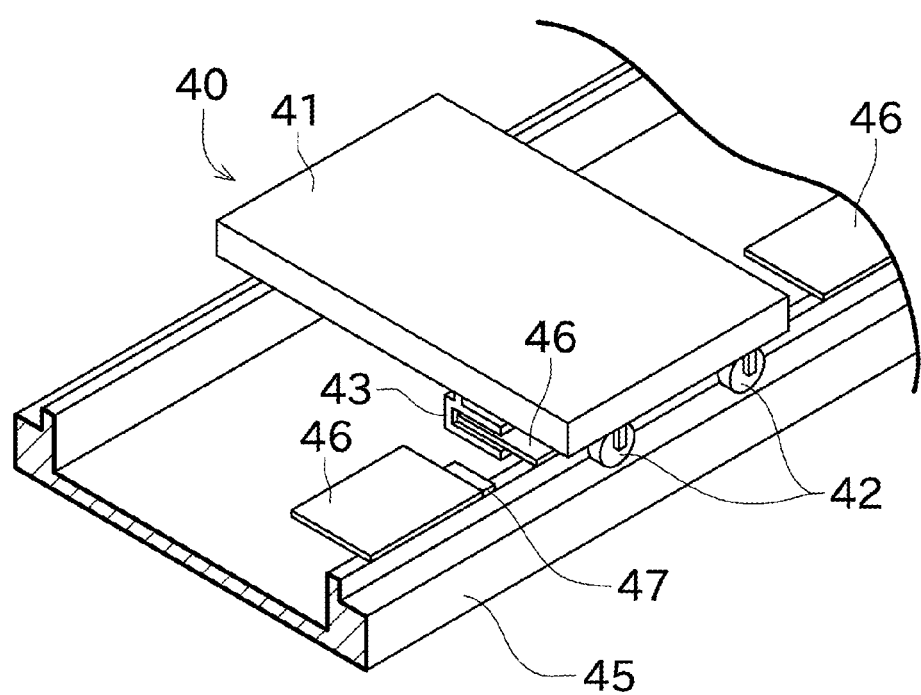
FIG. 2 is a perspective diagram showing an overview of a vehicle and a rail driven by the motor system.

Next, an example of applying the motor system 1 to conveyance of items will be briefly described with reference to FIG. 2.

A vehicle 40 is loaded with items, which are not shown in the figure. The vehicle 40 transfers the items by traveling along a rail 45. The vehicle 40 includes a base 41, wheels 42, and a movable element 43. The base 41 is a portion to which various components that constitute the vehicle 40 are attached. The wheel 42 is attached to the base 41. The movable element 43 is attached to the base 41 and moves integrally with the base 41. The movable element 43 includes the permanent magnet or the coil as described above.

The rail 45 is formed along the travel path of the vehicle 40. A plurality of stators 46 and a plurality of sensor pedestals 47 are attached to rail 45 at regular intervals. The stator 46 includes the permanent magnet or the coil as described above. The sensor pedestal 47 is a member for attaching a magnetic sensor, which is not shown in the figure. With the above configuration, the power is supplied to an appropriate coil to generate magnetic force from the coil, and by switching the coil to which power is supplied at an appropriate timing, force for moving the movable element 43 with respect to the stator 46 is generated. As a result, the vehicle 40 can travel along the rail 45.

Next, the driving force reduction suppression control will be explained. The driving force is the driving force generated by the motor 23, which is thrust that moves the movable element in linear motion in the linear motor; and is torque in the rotary motor. First, decrease in the driving force is explained. In a system in which one motor driver 21 controls multiple motors 23, as in this example, it is impossible to supply current to all motors 23 at all times, thus the driving force of the motors 23 for which no current is supplied becomes lower than the target value. The following is a specific explanation with reference to FIG. 3.

Figure 3:
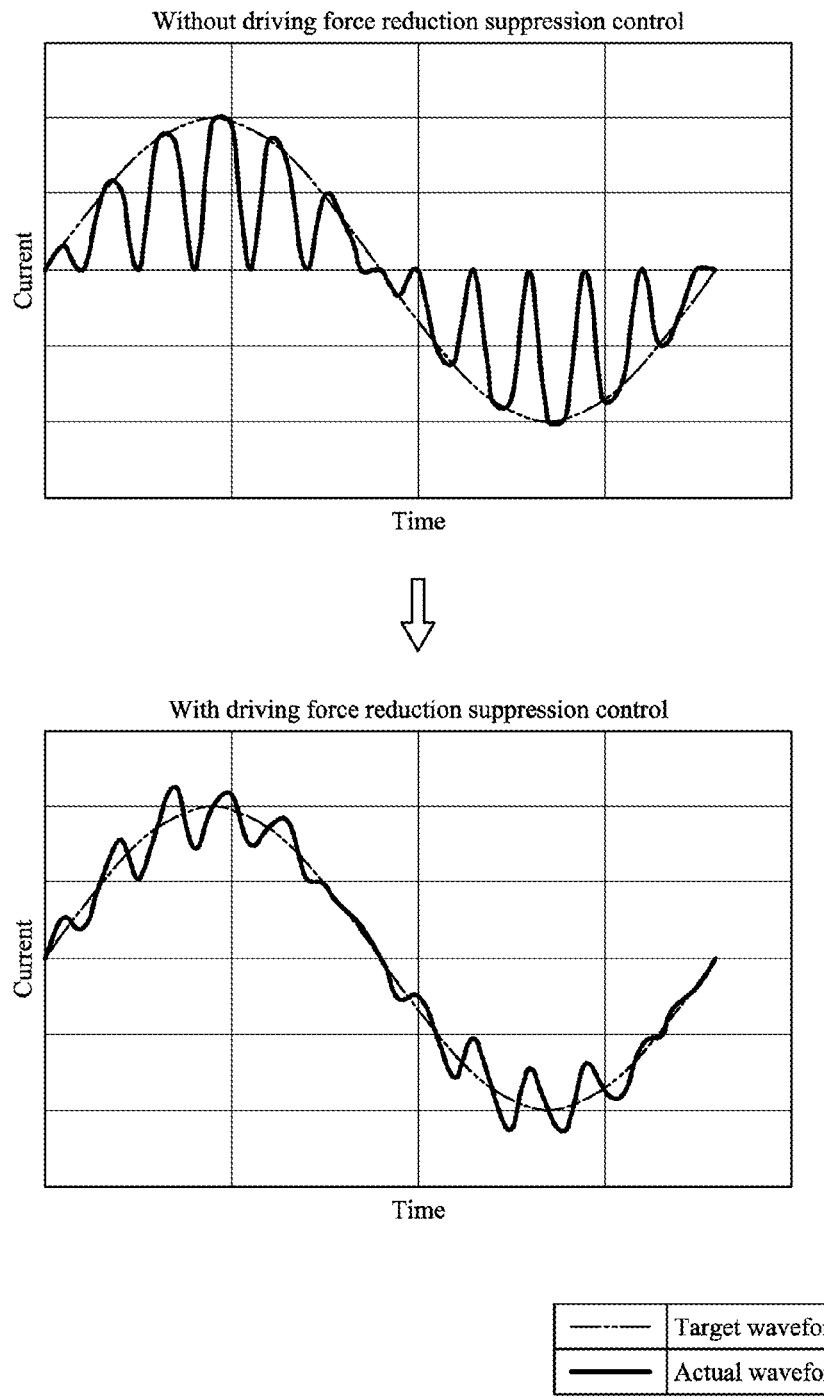
FIG. 3 are diagrams showing difference in an actual waveform of current with and without driving force reduction suppression control.

The upper graph of FIG. 3 shows that the driving force is reduced when the driving force reduction suppression control is not performed. In the graphs shown in FIG. 3, the horizontal axis is time and the vertical axis is the current flowing through the motor. The waveforms in the chain line shown in FIG. 3 are the target waveform. The target waveform is the waveform that shows the change in the current that should be supplied to the motor 23 to generate the required driving force. In other words, the waveform of the current flowing through the motor 23 when one motor driver 21 controls one motor 23 is the target waveform. The waveforms in the bold line in FIG. 3 are the waveforms of the current actually flowing through the motor 23. The current is supplied to the motor 23 from the motor driver 21 during some time periods, but is not supplied from the motor driver 21 during other time periods (the current is supplied to other motors 23). Thus, as shown in the upper graph in FIG. 3, a value of the current varies up and down. In the time period when the current is supplied to the motor 23, current that matches the target waveform is supplied to the motor 23. In other words, the motor 23 is supplied with the current that matches or is lower than the target waveform, resulting in a lower driving force generated by the motor 23 than the target value.

In this regard, by performing the driving force reduction suppression control, as shown in the lower graph in FIG. 3, current reduction is suppressed while the current includes a portion of the waveform where the current is higher than the target waveform (driving force reduction suppression process). As a result, the driving force of the motor 23 becomes higher and becomes closer to the target value compared to when the driving force reduction suppression control is not performed. The driving force reduction suppression control is described in detail below. The driving force reduction suppression control includes current holding control and current compensation control.

Figure 4:
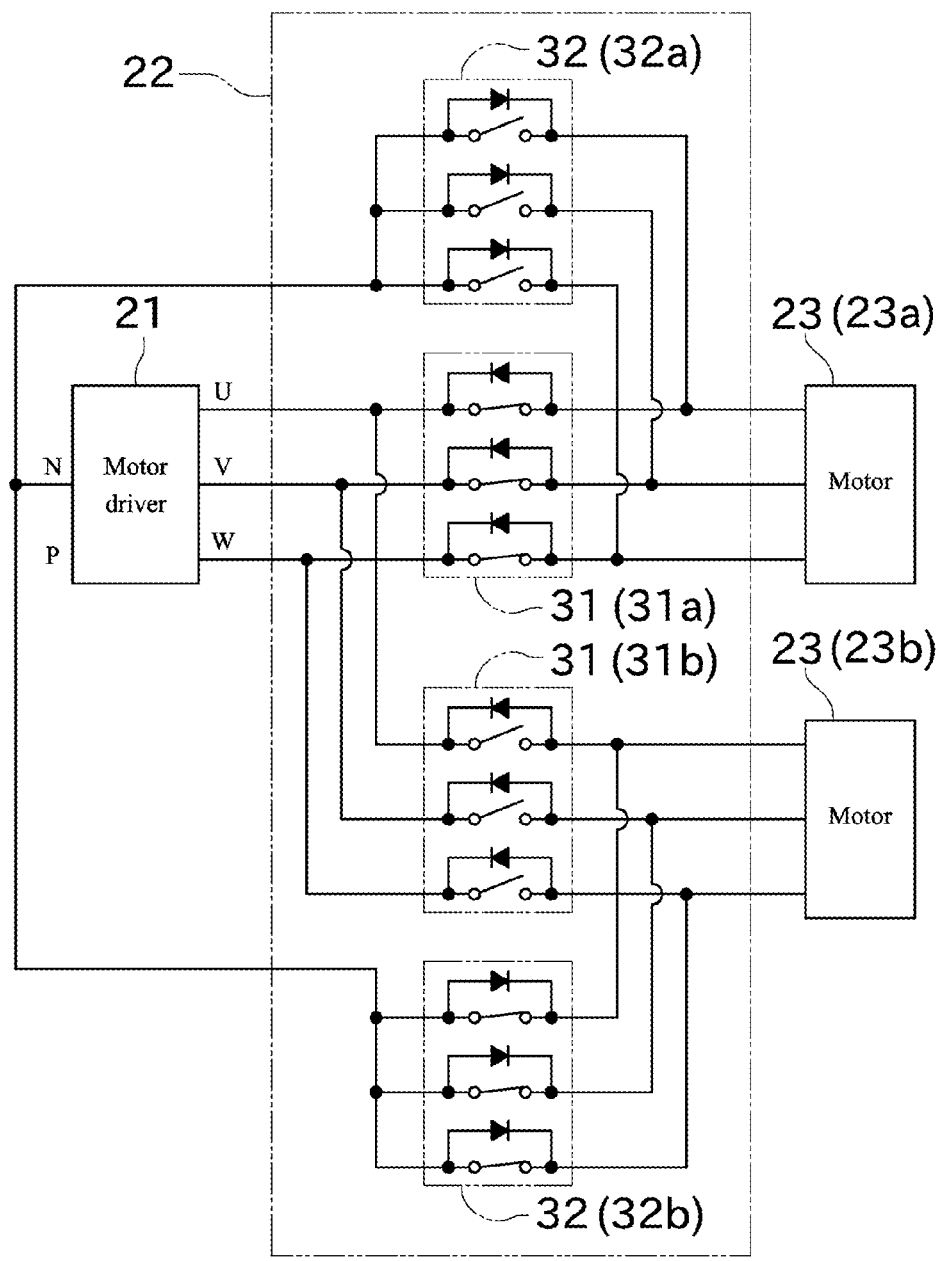
FIG. 4 is a diagram showing a circuit configuration for supplying current from the motor driver to a first motor.
Figure 5:
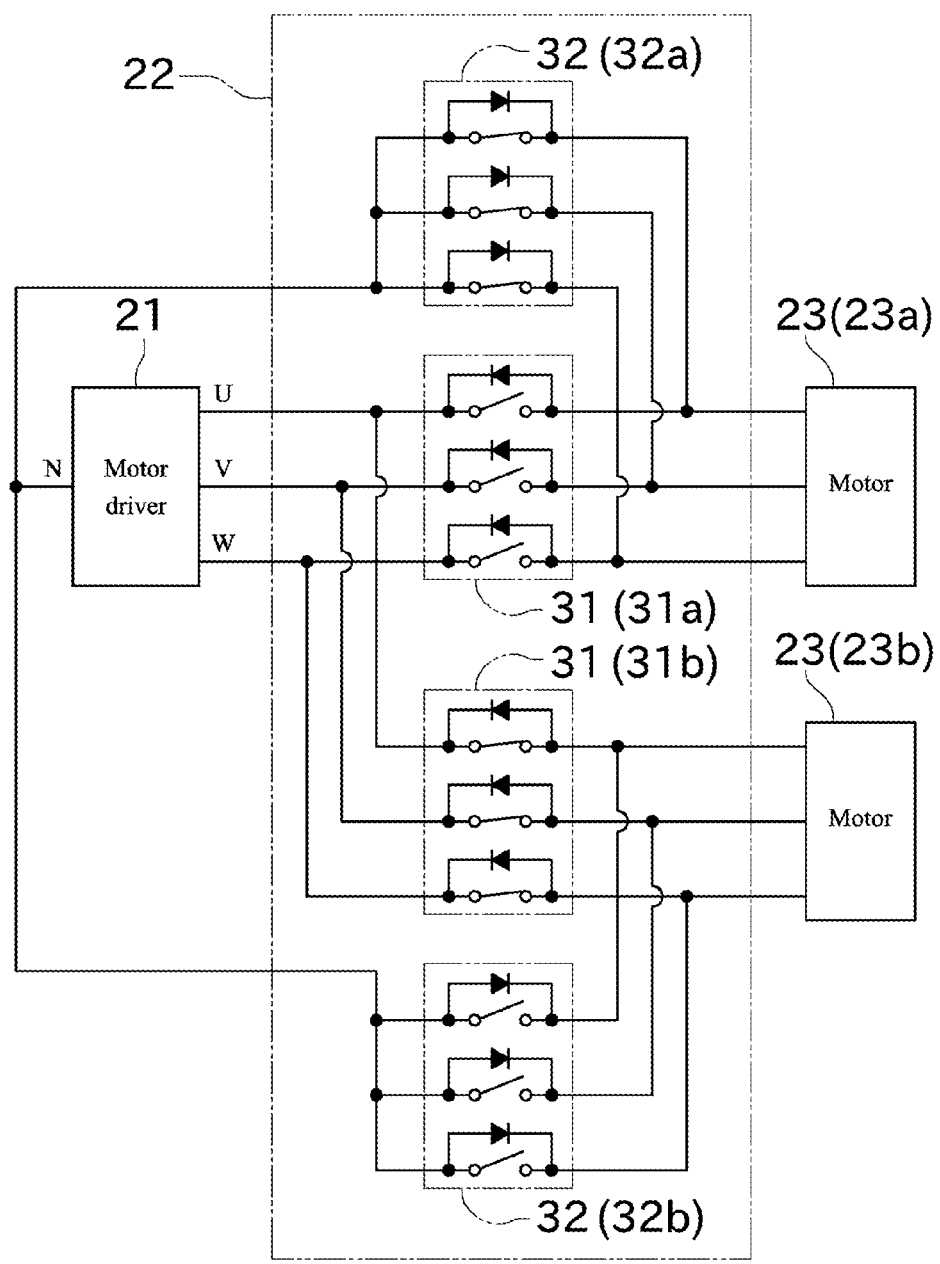
FIG. 5 is a diagram showing a circuit configuration for supplying current from the motor driver to a second motor.

First, the current holding control is described. The current holding control is a control to hold the current (suppress the current reduction) during the time when the current is not supplied to the motor 23. The current holding control is performed by controlling the switch unit 22. A configuration of the switch unit 22 for current holding control is described below with reference to FIGS. 4 and 5. As shown in FIGS. 4 and 5, the switch unit 22 has a supply switch unit 31 and a short circuit switch unit 32. In FIGS. 4 and 5, the switch unit 22 includes a plurality of diodes, but all of these diodes may be omitted.

The supply switch unit 31 is provided for each motor 23. A first side (left side of FIG. 4) of the supply switch unit 31 is connected to the motor driver 21, and a second side (right side of FIG. 4) of the supply switch unit 31 is connected to the motor 23. The supply switch unit 31 is, for example, a field effect transistor (FET) and comprises a switch element and a diode connected in parallel. The supply switch unit 31 may be a thyristor or an IGBT (Insulated Gate Bipolar Transistor). The diode allows current to flow in a direction from the motor 23 to the motor driver 21, but not in an opposite direction. Hereafter, a state in which the switch element is closed is referred to as a transmission state and a state in which the switch element is open is referred to as a shutdown state. When the supply switch unit 31 is in the transmission state, current can flow from the motor driver 21 to the motor 23. When the supply switch unit 31 is in the shutdown state, current cannot flow from the motor driver 21 to the motor 23. Since the motor 23 is a three-phase motor, switch elements and diodes are provided for each of the three phases: the U-phase, the V-phase, and the W-phase.

The short circuit switch unit 32 is provided for each motor 23. The first side (right side of FIG. 4) of the supply switch unit 31 is connected to a wire connecting the supply switch unit 31 to the motor 23. The wires of the U-phase, the V-phase, and the W-phase connected to the second side (left side of FIG. 4) of the supply switch unit 31 are electrically connected respectively. The short-circuit switch unit 32 is, for example, a field-effect transistor (FET) and comprises a switch element and a diode connected in parallel. The short-circuit switch unit 32 may be a thyristor or an IGBT. The diode carries current in a direction from the motor driver 21 to the motor 23, but not in an opposite direction. Hereafter, a state in which the switch element is closed is referred to as a transmission state and a state in which the switch element is open is referred to as a shutdown state. When the short-circuit switch unit 32 is in the transmission state, the U-phase, the V-phase, and the W-phase are short-circuited. When the short-circuit switch unit 32 is in the shutdown state, the U-phase, the V-phase, and the W-phase are not short-circuited.

In addition to the output terminals for the U-phase, the V-phase, and the W-phase, the motor driver 21 includes a P terminal and an N terminal (constant potential terminals). The P terminal and the N terminal are terminals whose potential is constant. The P terminal is a positive terminal of an input terminal of a main power supply of the motor driver 21, and the N terminal is a negative terminal of the input terminal of the main power supply of the motor driver 21. The second side (left side of FIG. 4) of the short-circuit switch unit 32 is connected to the N terminal of the motor driver 21. When the U-phase, the V-phase, and the W-phase are short-circuited, the potential becomes unstable. In this regard, the potential can be stabilized by connecting the second side of the short-circuit switch unit 32 (the short-circuited point) to the N terminal of the motor driver 21.

For example, as shown in FIG. 4, the motor driver 21 can supply current to two motors 23, which are referred to as a first motor 23a and a second motor 23b, respectively. The supply switch unit 31 corresponding to the first motor 23a is referred to as a first supply switch unit 31a, and the short circuit switch unit 32 corresponding to the first motor 23a is referred to as a first short circuit switch unit 32a. Similarly, a second supply switch unit 31b and a second short-circuit switch unit 32b correspond to the second motor 23b.

When the current flows from the motor driver 21 to the first motor 23a, the first supply switch unit 31a is set to the transmission state and the first short-circuit switch unit 32a is set to the shutdown state, as shown in FIG. 4. Furthermore, the second supply switch unit 31b is set to the shutdown state and the second short-circuit switch unit 32b is set to the transmission state.

Subsequently, to switch the current to flow from the motor driver 21 to the second motor 23b, the first supply switch unit 31a is set to the shutdown state and the first short-circuit switch unit 32a is set to the transmission state as shown in FIG. 5. Furthermore, the second supply switch unit 31b is put in the transmission state and the second short-circuit switch unit 32b is put in the cut-off state. The first short-circuit switch unit 32a is in the transmission state, which makes it easier for current to be held in this circuit. Therefore, the decrease in the current flowing through the first motor 23a can be delayed, and thus the decrease in the driving force of the first motor 23a can be suppressed to some extent.

Figure 6:
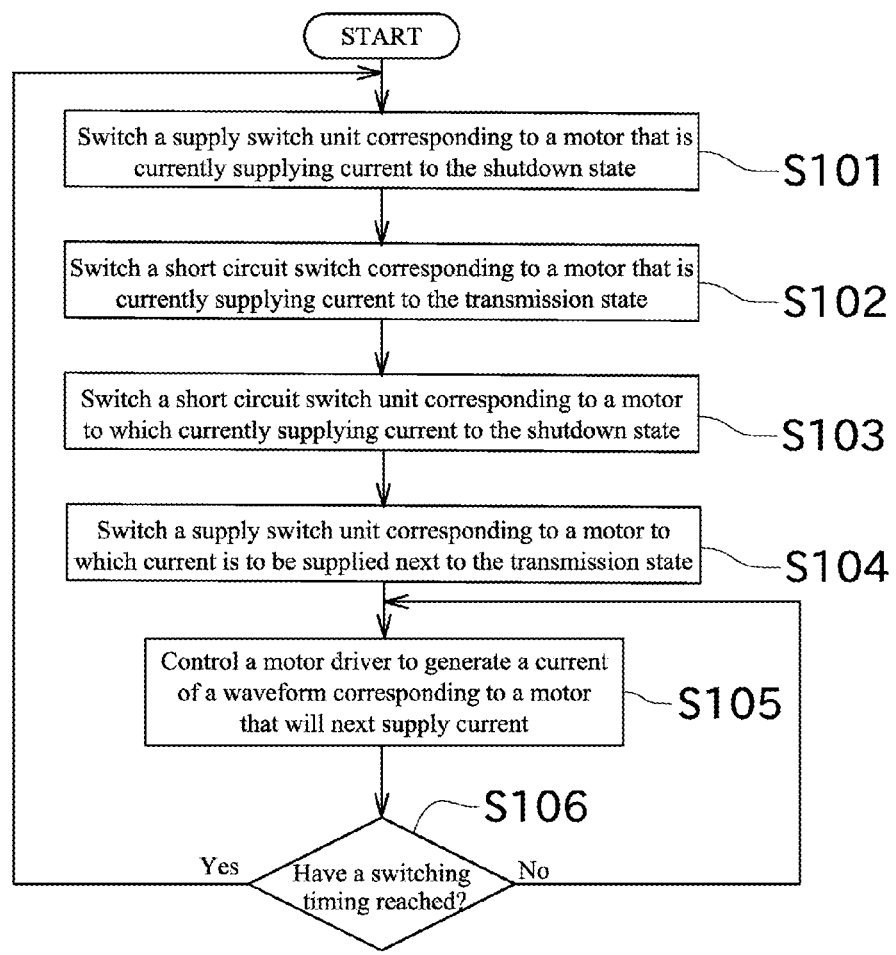
FIG. 6 is a flowchart showing current holding control.

Next, a flow of the current holding control is described with reference to FIG. 6. The sequence of each process shown in FIG. 6 is an example, and multiple processes may be executed simultaneously, or the order in which the processes are executed may be different from that shown in FIG. 6. For example, a process of S101 and a process of S102 shown in FIG. 6 may be executed at the same time. In addition, a process of S103 and a process of S104 may be performed at the same time.

The controller 10 performs steps S101 to S105 every predetermined time. The controller 10 switches the motor 23 that supplies current at each switching timing. In this example, current is supplied to the plurality of motors 23 in turn to drive the plurality of motors 23 substantially simultaneously.

Initially, the switching controller 12 of the controller 10 switches the supply switch unit 31 corresponding to the motor 23 that is currently supplying current at a new switch switching cycle timing to the shutdown state (S101). As a result, current is no longer supplied to the motor 23 from the motor driver 21. Next, the driving force reduction suppression unit 15 of the controller 10 switches the short circuit switch unit 32 corresponding to the motor 23 that is currently supplying current to the motor 23 to the transmission state (S102). This allows the current reduction to be suppressed as described above. By switching the supply switch unit 31 prior to the short circuit switch unit 32, a short circuit can be prevented while current is being supplied from the motor driver 21.

Next, the driving force reduction suppression 15 of the controller 10 switches the short circuit switch unit 32 corresponding to the motor 23 to which the current is to be supplied next to the shutdown state (S103). This releases the short-circuits of the U-phase, the V-phase, and the W-phase.

Next, the switching controller 12 of the controller 10 switches the supply switch unit 31 corresponding to the motor 23 to which the current is to be supplied next to the transmission state (S104). As a result, current is supplied from the motor driver 21 to the motor 23 that will supply current next. By switching the short circuit switch unit 32 prior to the supply switch unit 31, a short circuit can be prevented while current is being supplied from the motor driver 21.

Next, the output controller 11 of the controller 10 controls the switching controller 12 to generate a current of a waveform corresponding to the motor 23 that will next supply current (S105). Specifically, the output control signal corresponding to the motor 23 to which the current is next supplied is generated and sent to the corresponding motor driver 21.

The controller 10 determines whether the next switch switching cycle timing has been reached (S106), and if it is determined that the next switch switching cycle timing has been reached, the processes from step S101 to S105 are performed again. If the determination in S106 is negative, i.e., it is determined that the next switch switching cycle timing has not been reached, the processes S105 and S106 are performed again.

As described above, the current can be maintained even during the time when the current is not supplied to the motor 23 from the motor driver 21. By performing the current holding control, the next current is supplied from motor driver 21 while the current is being held (i.e., before the current flowing through motor 23 becomes zero). Thus, the plurality of motors 23 can continue to be driven without stopping.

Figure 7:
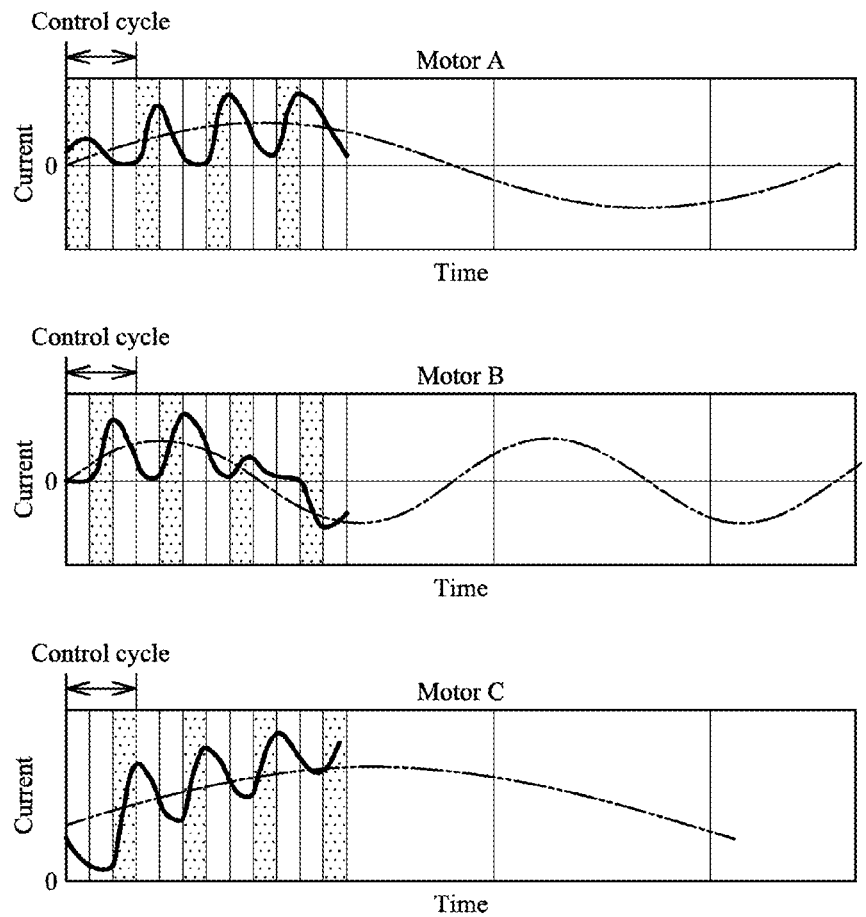
FIG. 7 is a diagram showing current compensation control.

Next, the current compensation control is described with reference to FIGS. 7 and 8. The current compensation control is a control in which a higher current is supplied to the motors 23 in advance during the time when current is supplied from the motor driver 21 to the motors 23, in anticipation of a lower current during the time when current is not supplied from the motor driver 21 to the motors 23. Since the current holding control does not reduce the current reduction to zero, it is preferable to use both the current holding control and the current compensation control. However, these controls are independent, and the motor system 1 may be configured to control only one of them.

The following is a detailed description of the current compensation control, using three motors 23 as an example. FIG. 7 shows the target waveform and actual waveform of the current corresponding to each of the three motors 23 (motor A, motor B, and motor C) when the current is supplied to the three motors 23 in a time-division manner. A time period when current can be supplied from the motor driver 21 to the motor 23 is referred as a supply time period, and a time period when current cannot be supplied from the motor driver 21 to the motor 23 is referred as a standby time period. Thus, when the motor A is in the supply time period, the motor B and the motor C are in the standby time period. As shown in FIG. 7, the current flowing in each of the 23 motors increases during the supply time period and decreases during the standby time period.

Figure 8:
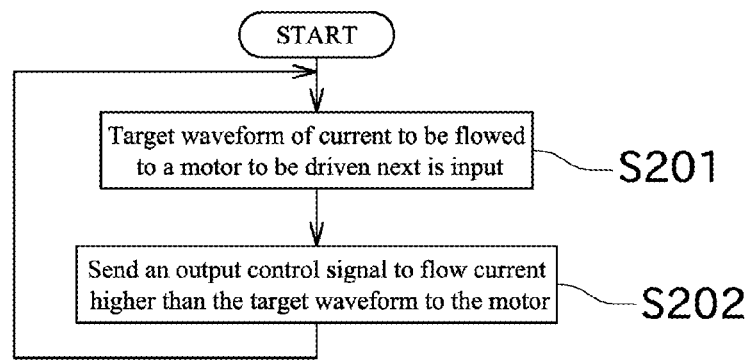
FIG. 8 is a flowchart showing a process of generating an output control signal to be supplied to the motor driver in the current compensation control.

The current supplied by the motor driver 21 to the motors 23 during the supply time period is determined according to the flowchart in FIG. 8. The flowchart in FIG. 8 is part of the process of step S103 in FIG. 6. The target waveform of the current to be flowed to the motor 23 to be driven next is input to the controller 10 (S201). Next, the driving force reduction suppression unit 15 of controller 10 generates the output control signal to flow current higher than the target waveform to the motor 23 and sends the output control signal to the motor driver 21 (S202). If current matching the target waveform is flowed to the motor 23, the current supplied to the motor 23 will be much lower than the target waveform in the time average, considering that the current decreases during the standby time period. In this regard, the current that decreases during the standby time period can be covered by flowing current to the motor 23 that is higher than the target waveform.

The current higher than the target waveform means that the current indicated by the output control signal (or the current actually flowing, hereinafter the same) is higher than the target waveform during some or all of the supply time period. Naturally, the current indicated by the output control signal may be higher than the target waveform over the entire supply time period. The average value of the current indicated by the output control signal over the supply time period may be higher than the average value of the current of the target waveform over the supply time period.

The above current holding control and current compensation control can bring the actual waveform closer to the target waveform as shown in the lower graph in FIG. 3. Therefore, the driving force generated by the motor 23 can be brought closer to the target value.

Next, with reference to FIGS. 9-11, a variation of the above example will be described. In the following description, members identical or similar to the aforementioned examples are marked with the same reference numerals in the drawings and may be omitted from the description.

Figure 9:
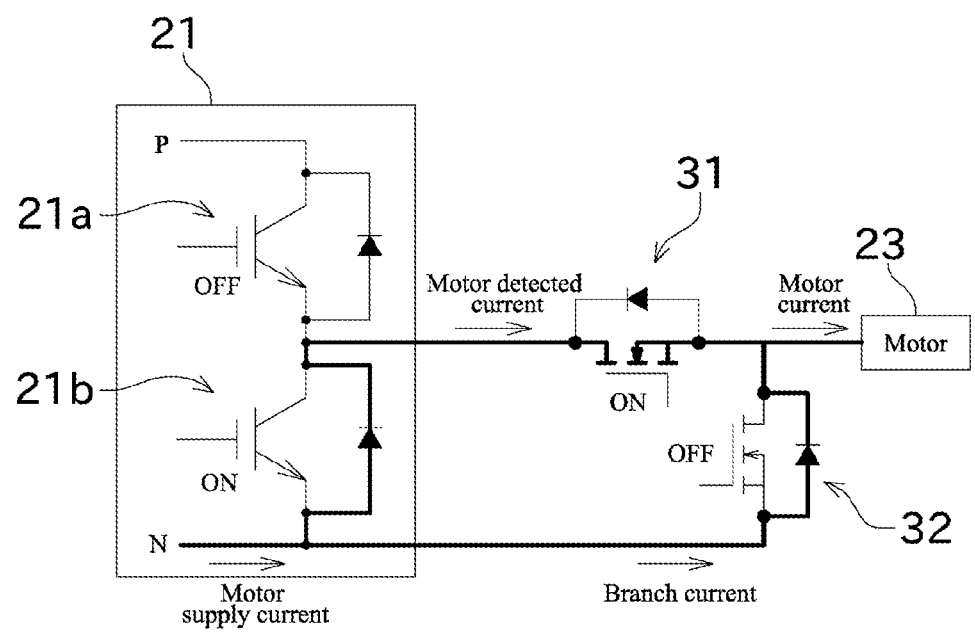
FIG. 9 is a circuit diagram showing that the motor supply current output from the motor driver is split into a motor detection current and a branch current and output to the motor.

First, with reference to FIG. 9, an explanation is given of the current supplied from the motor driver 21 to the motor 23 ("motor supply current") splitting in the middle. In FIG. 9, only the circuit supplying current to one of the plurality of motors 23 is shown. Furthermore, FIG. 9 shows only the circuit supplying current in one of the three phases of AC.

In FIG. 9, the situation is shown where the first switch unit 21a of the motor driver 21 is in the shutdown state (off) and the second switch unit 21b of the motor driver 21 is in the transmission state (on). The first switch unit 21a includes the switch element connected to the P terminal described above, and the second switch unit 21b includes the switch element connected to the N terminal described above. As mentioned above, the short-circuit switch unit 32 is connected to the N terminal.

Furthermore, FIG. 9 shows a situation where the supply switch unit 31 is in the transmission state (on) and the short-circuit switch unit 32 is in the shutdown state (off). In the situation shown in FIG. 9, it is assumed that the current flowing through the motor 23 ("motor current") is flowing from the motor driver 21 in a direction of motor 23.

The current detected by the motor driver 21 (motor detected current) is the current flowing through an output unit of the motor driver 21 (in other words, the current flowing through the supply switch unit 31). Under conditions where current is supplied to the motor 23, the motor detected current is usually the same as the motor current.

The short circuit switch unit 32 is a FET. The FET, by its construction, includes the diode (body diode) as well as the switch element. The diode is provided in parallel with the switch element in the circuit. Therefore, in the situation shown in FIG. 9, current (branch current) is supplied to the motor 23 through the diode of the short-circuit switch unit 32, even though the short-circuit switch unit 32 is in the shutdown state.

Therefore, the current obtained by subtracting the branch current from the motor current is the motor detected current. Therefore, the current value detected by the motor driver 21 is not stable. Specifically, the current flowing through the motor 23 is detected to be smaller than the actual current flowing through the motor 23. As a result, the motor 23 may not be able to operate accurately.

The situation where the current detected by the motor driver 21 becomes unstable occurs only in the situation shown in FIG. 9. This is because in the situation where the first switch unit 21a is in the transmission state (on) and the second switch unit 21b is in the shutdown state (off), no current flows through the short circuit switch unit 32. Also, if current flows from the motor 23 towards the motor driver 21, it is because the diode in the short-circuit switch unit 32 interrupts this current.

Figure 10:
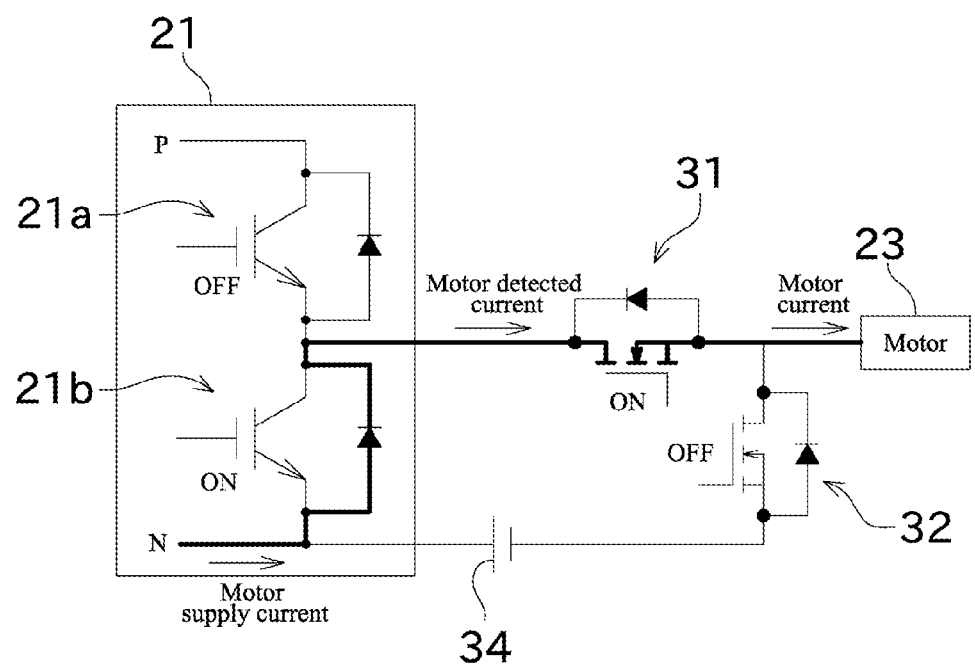
FIG. 10 is a circuit diagram showing that the branch current is reduced by a negative power supply.

In a first modification shown in FIG. 10, a negative power supply 34 is provided in the circuit connecting the motor driver 21 and the short-circuit switch unit 32 to deal with a situation where the current detected by the motor driver 21 becomes unstable. The negative power supply 34 provides voltage in a direction that cancels the current flowing from the motor driver 21 to the motor 23, in other words, in a direction that allows current to flow from the motor 23 to the motor driver 21. The negative power supply 34 reduces the branch current and thus stabilizes the current detected by the motor driver 21. Reduction of the branch current includes not only the current value of the branch current becoming smaller and larger than zero, but also the current value of the branch current becoming smaller and zero (i.e., no branch current flow). The diode in the short circuit switch unit 32 interrupts the current from the motor 23 to the motor driver 21 so that no unwanted current due to the negative power supply 34 flows.

Figure 11:
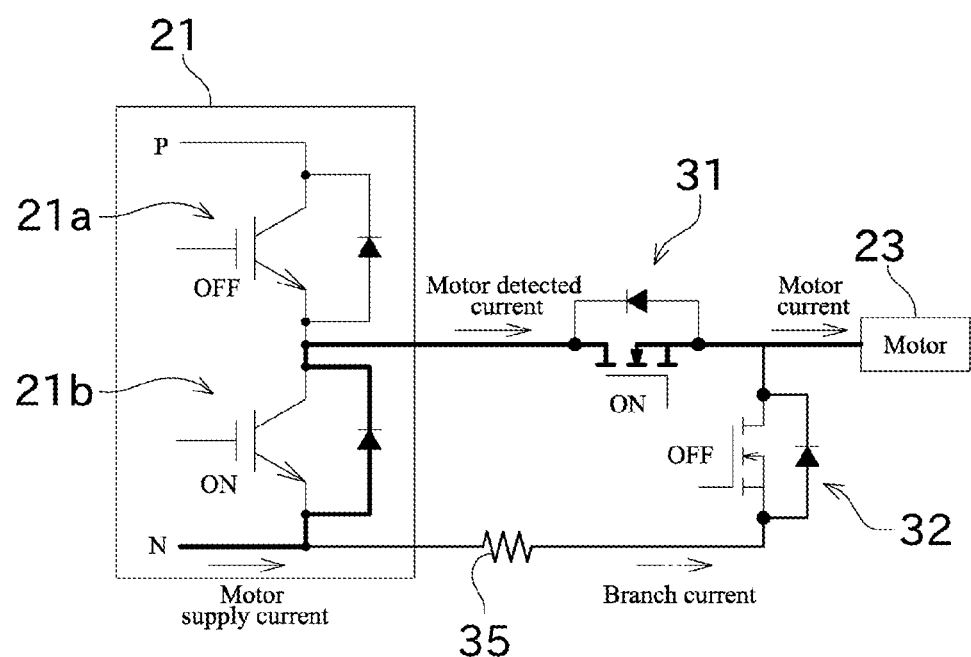
FIG. 11 is a circuit diagram showing that the branch current is reduced by electrical resistance.

In a second modification shown in FIG. 11, an electrical resistor 35 is provided in the circuit connecting the motor driver 21 and the short-circuit switch unit 32 to deal with a situation where the current detected by the motor driver 21 becomes unstable. The electrical resistor 35 reduces the branch current and thus stabilizes the current detected by the motor driver 21.

As explained above, the motor system 1 of the above example includes the motor driver 21, the plurality of motors 23, the supply switch unit 31, the output controller 11, the switching controller 12, and the driving force reduction suppression unit 15. The motor 23 generates driving force by the power supplied by the motor driver 21. The supply switch unit 31 switches the circuit so that the power supplied by the motor driver 21 is supplied to any one of the plurality of motors 23. The output controller 11 controls the motor driver 21 so that the motor driver 21 supplies the power matched to the one motor 23 to which the power is supplied. The switching controller 12 controls the supply switch unit 31 so that the one motor 23 to which power is supplied is switched cyclically, thereby distributing the power supplied by the motor driver 21 to the plurality of motors 23 in a time-division manner. The driving force reduction suppression unit 15 controls to suppress reduction of the driving force generated by the other motors 23 while the power being supplied to one of the plurality of motors 23 that are cyclically supplied with the power.

This allows a single motor driver 21 to drive multiple motors 23 substantially simultaneously. In addition, the driving force reduction suppression unit 15 can suppress the reduction of the driving force while power is not supplied so that the driving force of each of the motors 23 is not reduced to an extreme level, thus allowing the motors 23 to generate a driving force that is at or close to the target value.

In the motor system 1 of the above example, the motor 23 is a three-phase motor. The motor system 1 includes the short-circuit switch unit 32 for each of the motor 23 that short-circuits the U-phase, V-phase, and W-phase that supply power to the motor 23. The driving force reduction suppression unit 15 closes the short-circuit switch unit 32 corresponding to the motor 23 that is not supplied with power among the plurality of motors 23 that are cyclically supplied with power to short-circuit the U-phase, V-phase, and W-phase.

This makes it easier for the current to be held by closing the short-circuit switch unit 32. Therefore, a decrease in current (i.e., a decrease in driving force) during the period when power is not being supplied can be suppressed.

In the motor system 1 of the above configuration, the circuit connecting the motor driver 21 and the short-circuit switch unit 32 is provided with the negative power supply 34 or the electrical resistance 35 that reduces the current (branch current) supplied from the motor driver 21 through the short-circuit switch unit 32 to the motor 23.

This reduces the branching current, thus stabilizing the current detected by the motor driver 21 and allowing the motor driver 21 to correctly detect the current flowing thorough the motor 23.

In the motor system 1 of the above example, the motor driver 21 includes the constant potential terminal whose potential is constant. When the short-circuit switch unit 32 is closed, the short-circuited point is connected to the constant potential terminal.

This allows for stable switching of the short-circuit switch unit by maintaining the constant potential at the short-circuited point.

In the motor system 1 of the above example, when the waveform indicating the change in the current to be supplied to the motor 23 to generate the required driving force is referred to as the target waveform, the driving force reduction suppression unit 15 controls to flow a current higher than a current indicated by the target waveform to the motor 23 in a state where the supply switch unit 31 is closed (the short-circuit switch unit 32 is opened).

If the current indicated by the target waveform is supplied to the motor 23, the current will decrease while the current is not supplied, and as a result, the required driving force may not be generated. In this regard, by supplying motor 23 with a current higher than that indicated by the target waveform as described above, a driving force close to the target value can be generated.

In the motor system 1 of this example, the motor 23 is the linear motor.

Alternatively, the motor 23 may be a rotary motor.

The above allows our systems to be effective in systems of various configurations.

The motor drive method of the above example drives the plurality of motors 23 by repeatedly performing the selection process, the switching process, and the power control process. In the selection process, the motor 23 to be supplied with the power is selected among the plurality of motors 23. In the switching process, the switch connecting the motor driver 21 and the plurality of motors 23 is switched so that power is supplied from the motor driver 21 to the motor 23 selected in the selection process. In the power control process, the motor driver 21 is controlled so that power is supplied according to the selected motor 23. While the power being supplied to one of the plurality of motors 23 to which the power is supplied, the driving force reduction control process is performed to suppress the reduction in the driving force generated by the other of the plurality of motors 23.

While preferred examples have been described above, the above-described configuration may be modified, for example, as follows.

In the above example, the motor driver 21 and the switch unit 22 are separate devices, but instead of this, a single device having the functions of both the motor driver 21 and the switch unit 22 may be provided in the motor system 1.

The above example describes a structure in which the motor 23 is the linear motor and the motor system 1 is applied as a drive system for the vehicle 40 for conveyance. Instead, the linear motor can be applied to another device (e.g., a processing apparatus or a measuring apparatus including a linearly moving part). If the motor 23 is the rotary motor, the motor system 1 may be applied to a drive system for a vehicle, or to a processing apparatus or a measuring apparatus including a part that moves rotatingly.

The flowchart shown in the above example is only one example, and some processes may be omitted, the contents of some processes may be changed, or new processes may be added. For example, in the flowchart shown in FIG. 6, between steps S102 and S103, a process to confirm whether the switching of the switch unit is completed or not may be added.

In the above example, the short-circuited point is connected to the N terminal of the motor driver 21. However, this configuration is not mandatory, and the short-circuited point does not have to be connected to another point.

The invention claimed is:

1. A motor system comprising:
   a motor driver;
   a plurality of motors that generate a driving force by power supplied by the motor driver;
   a supply switch that switches a circuit so that the power supplied by the motor driver is supplied to any one of the plurality of the motors;
   an output controller that controls the motor driver so that the motor driver supplies power matched to the one motor to which the power is supplied;
   a switching controller that distributes the power supplied by the motor driver to the plurality of the motors in a time-divisional manner by controlling the supply switch so that the one of the plurality of the motors to which the power is supplied is cyclically switched; and
   a driving force reduction suppressor that controls suppression reduction of the driving force generated by the other of the plurality of the motors while the power being supplied to one of the plurality of the motors that are cyclically supplied with the power;
   wherein, when a waveform indicating a change in current to be supplied to the motor to generate required driving force is referred to as a target waveform, the driving force reduction suppressor controls flow of a current higher than a current indicated by the target waveform to the motor in a state where the supply switch is closed.

2. The motor system according to claim 1, wherein
   the motor is a three-phase motor,
   the motor system comprises a short-circuit switch provided for each of the plurality of the motors to short-circuit a U-phase, a V-phase, and a W-phase that supply power to the motor, and
   the driving force reduction suppressor closes the short-circuit switch corresponding to the motor not supplied with power among the plurality of the motors cyclically supplied with power to short-circuit the U-phase, the V-phase, and the W-phase.

3. The motor system according to claim 2, wherein the circuit connecting the motor driver and the short circuit switch is provided with a negative power supply or an electrical resistance that reduces current supplied from the motor driver through the short circuit switch to the motor.

4. The motor system according to claim 2, wherein
   the motor driver comprises a constant potential terminal whose potential is constant, and
   when the short-circuit switch is closed, a short-circuited point is connected to the constant potential terminal.

5. The motor system of claim 1, wherein the motor is a linear motor.

6. The motor system according to claim 1, wherein the motor is a rotary motor.

7. A motor drive method that execute processes repeatedly to drive a plurality of motors comprising:
   selecting a motor to supply power among the plurality of the motors;
   switching a switch connecting a motor driver and the plurality of the motors so that power is supplied from the motor driver to the motor selected in the selection process; and
   controlling the motor driver so that power according to the selected motor is supplied, wherein
   while the power being supplied to one of the plurality of the motors to which the power is supplied, a driving force reduction suppression process is performed to suppress reduction of a driving force generated by the other of the plurality of the motors;
   wherein, when a waveform indicating a change in current to be supplied to the motor to generate required driving force is referred to as a target waveform, the driving force reduction suppressor controls flow of a current higher than a current indicated by the target waveform to the motor in a state where the supply switch is closed.

* * * * *